United States Patent
Lee et al.

(10) Patent No.: US 12,006,980 B2
(45) Date of Patent: Jun. 11, 2024

(54) ROLLING BEARING HAVING IMPROVED SEALABILITY

(71) Applicant: BEARINGART, Gyeongju-si (KR)

(72) Inventors: Young Keun Lee, Yongin-si (KR); Kyu Bok Kim, Seoul (KR)

(73) Assignee: BEARINGART, Gyeongju-si (KR)

( * ) Notice: Subject to any disclaimer, the term of this patent is extended or adjusted under 35 U.S.C. 154(b) by 249 days.

(21) Appl. No.: 17/492,948

(22) Filed: Oct. 4, 2021

(65) Prior Publication Data
US 2022/0025931 A1  Jan. 27, 2022

Related U.S. Application Data

(63) Continuation of application No. PCT/KR2020/004601, filed on Apr. 3, 2020.

(30) Foreign Application Priority Data

Apr. 3, 2019  (KR) .................. 10-2019-0039292

(51) Int. Cl.
*F16C 33/78* (2006.01)
*F16C 33/80* (2006.01)
(Continued)

(52) U.S. Cl.
CPC ...... *F16C 33/7846* (2013.01); *F16C 33/7823* (2013.01); *F16C 33/7853* (2013.01);
(Continued)

(58) Field of Classification Search
CPC .. F16C 19/06; F16C 33/7823; F16C 33/7846; F16C 33/7853; F16C 33/80; F16C 33/805; F16C 43/045; F16J 15/3232; F16J 15/447
See application file for complete search history.

(56) References Cited

U.S. PATENT DOCUMENTS

2015/0247533 A1 * 9/2015 Fickert-Guenther ............. F16C 33/805
                                                                384/480
2016/0017923 A1 * 1/2016 Ishii ................ F16C 33/7846
                                                                384/470

FOREIGN PATENT DOCUMENTS

DE   19605179 A1 * 8/1997 ............ F16C 33/726
JP   H09250548 A    9/1997
(Continued)

OTHER PUBLICATIONS

Machine Translation of WO-2017069225-A1 (Year: 2017).*
(Continued)

*Primary Examiner* — Alan B Waits
(74) *Attorney, Agent, or Firm* — Dinsmore & Shohl LLP; Yongsok Choi, Esq.

(57) ABSTRACT

A sealing member of a rolling bearing is formed in a structure in which an elastic sealing portion is attached to a frame, and the elastic sealing portion may comprise a first sealing portion formed on one end portion of the frame and a second sealing portion formed on the other end portion of the frame. The first sealing portion may be inserted into and mounted to a coupling groove formed in the second member, and the second sealing portion may comprise an axial sealing lip extending in the axial direction from the frame and a radial sealing lip extending in the radial direction from the frame. The axial sealing lip and the radial sealing lip of the second sealing portion may be positioned adjacent to the first member and may be configured to perform a sealing in a non-contact manner.

9 Claims, 6 Drawing Sheets

(51) Int. Cl.
　　　*F16C 43/04*　　　(2006.01)
　　　*F16J 15/32*　　　(2016.01)
　　　*F16J 15/3232*　　(2016.01)
　　　*F16J 15/447*　　 (2006.01)
　　　*F16C 19/06*　　　(2006.01)

(52) U.S. Cl.
　　　CPC ............ *F16C 33/80* (2013.01); *F16C 33/805* (2013.01); *F16C 43/045* (2013.01); *F16J 15/3232* (2013.01); *F16J 15/447* (2013.01); *F16C 19/06* (2013.01)

(56) References Cited

FOREIGN PATENT DOCUMENTS

| | | | |
|---|---|---|---|
| JP | 2000065074 A | 3/2000 | |
| JP | 2008039066 A | 2/2008 | |
| JP | 2009079643 A | 4/2009 | |
| JP | 2017180739 A | 10/2017 | |
| KR | 1020180064012 A | 6/2018 | |
| WO | WO-2017069225 A1 * | 4/2017 | .............. F16C 19/06 |

OTHER PUBLICATIONS

Machine Translation of JP 2008039066 (Year: 2008).*
Machine Translation of DE-19605179-A1 (Year: 1997).*
International Search Report of PCT/KR2020/004601 dated Jul. 7, 2020.

* cited by examiner

ROLLING BEARING HAVING IMPROVED SEALABILITY

CROSS-REFERENCE TO RELATED APPLICATION

This application is a continuation of International Application No. PCT/KR2020/004601 filed on Apr. 3, 2020, which claims priority to Korean Patent Application No. 10-2019-0039292 filed on Apr. 3, 2019, the entire contents of which are herein incorporated by reference.

TECHNICAL FIELD

The present invention relates to a rolling bearing that rotatably mounts and supports a rotary element relative to a non-rotary element in a rotating device, and more particularly, to a rolling bearing capable of improving a structure of a sealing member to be mounted between an inner ring and outer ring of the rolling bearing and enhancing a sealing property.

BACKGROUND ART

A bearing is a part which is mounted between a rotary element and a non-rotary element in a rotation device to assist a relative motion between the rotary element and the non-rotary element, and may be classified into a sliding bearing and a rolling bearing according to the type of contact between the bearing and a rotational shaft.

Among these, the rolling bearing supports the rotational shaft using rolling elements such as balls or rollers, and has an advantage in that a frictional resistance is small compared to the sliding bearing which comes into direct contact with a portion of the rotational shaft. Accordingly, the rolling bearing has been used in various fields in the form of a ball bearing, a tapered roller bearing, a needle bearing, and the like according to the shape of the rolling elements.

The bearing operates with lubricant oil (grease) filled therein in order to ensure a smooth relative movement between the rotary element and the non-rotary element. A sealing member is mounted on both end portions of the bearing to prevent the lubricant oil inside the bearing from leaking out or an external foreign matter from entering the bearing.

If the lubricant oil inside the bearing leaks out or the external foreign matter enters the bearing, rolling elements or raceway surfaces for the rolling elements are worn out or damaged during the operation of the bearing. This degrades the performance of the bearing and shortens the lifetime thereof. For this reason, the sealing member is regarded as one of the most important members in determining the performance and lifetime of the bearing. Various studies for improving the performance of the sealing member have been performed in the field of bearing.

In order to more stably prevent inflow of the external foreign matter or the like through the sealing member, it may be advantageous to perform sealing by bringing a large number of sealing lips into contact with a counterpart, or by bringing a thicker sealing lip into contact with the counterpart. However, the increase in the number or thickness of the sealing lips to be contacted with the counterpart may arise a problem in that friction resistance is greatly generated at contact sites of the sealing lips during the operation of the bearing, resulting in an increase in drag torque. This degrades the driving property and fuel ratio of the vehicle.

In order to solve such problems, in recent years, a technique has been widely used in which a sealing lip is arranged in a non-contact manner and a labyrinth structure of a relatively long length and a relatively narrow width is formed inside a sealing member using such a non-contact-type sealing lip, thus preventing inflow of a foreign matter or leakage of a lubricant oil.

Figure 1:
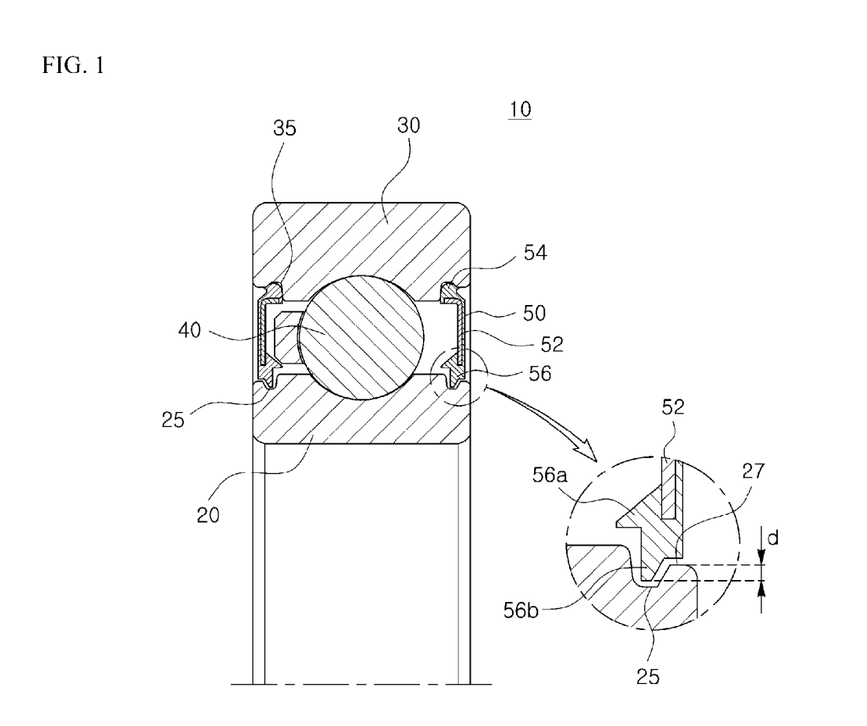
FIG. 1 exemplarily illustrates an example of a rolling bearing for performing sealing in a non-contact manner.

For example, referring to FIG. 1, a structure of a conventional rolling bearing with such a non-contact-type sealing member is illustrated by way of example. As illustrated in FIG. 1, the non-contact-type sealing member is configured such that a sealing lip of the sealing member is arranged adjacent to a counterpart (for example, an inner ring or an outer ring) rather than in contact with the counterpart to form a narrow complex structure of passage inside the sealing member, thus preventing inflow of external foreign matters or leakage of internal lubricant oil.

Specifically, a rolling bearing 10 comprising the non-contact-type sealing member is configured such that a plurality of rolling elements 40 are interposed between an inner ring 20 and an outer ring 30 like in a conventional rolling bearing, and may be configured to seal a bearing space defined between the inner ring 20 and the outer ring 30 by a sealing member 50.

The sealing member 50 may be formed in a structure in which an elastic sealing portion 54 is attached to a frame 52 forming a basic skeleton. The elastic sealing portion 54 may be configured to comprise a first sealing portion 54 formed on one side of the frame 52 and a second sealing portion 56 formed on the other side of the frame 52. The first sealing portion 54 may be inserted into and mounted to a coupling groove 35 formed in the outer ring 30. The second sealing portion 56 may be configured to be inserted in a sealing recess 25 formed in the inner ring 20 to perform sealing in a non-contact manner.

Specifically, the second sealing portion 56 may comprise an axial sealing lip 56a extending in an axial direction and a radial sealing lip 56b extending in a radial direction. The axial sealing lip 56a is arranged adjacent to an outer circumferential surface of the inner ring 20, and the radial sealing lip 56b is formed in a shape corresponding to the sealing recess 25 of the inner ring 20 and is arranged adjacent to the sealing recess 25. Thus, a narrow passage is formed between an internal space of the rolling bearing and the outside of the rolling bearing so that the sealing is performed in a non-contact manner.

In this regard, in the case of the non-contact-type sealing member 50 configured as above, it may be advantageous for the sealing property to form the radial sealing lip 56b is formed as long as possible to make the labyrinth structure formed by the sealing lip and the inner ring as long as possible. That is, it may be advantageous to make a radial length d between a stepped portion 27 formed at the end portion of the inner ring 20 and the radial end portion of the radial sealing lip 56b as long as possible to ensure a higher sealing property.

Figure 2:
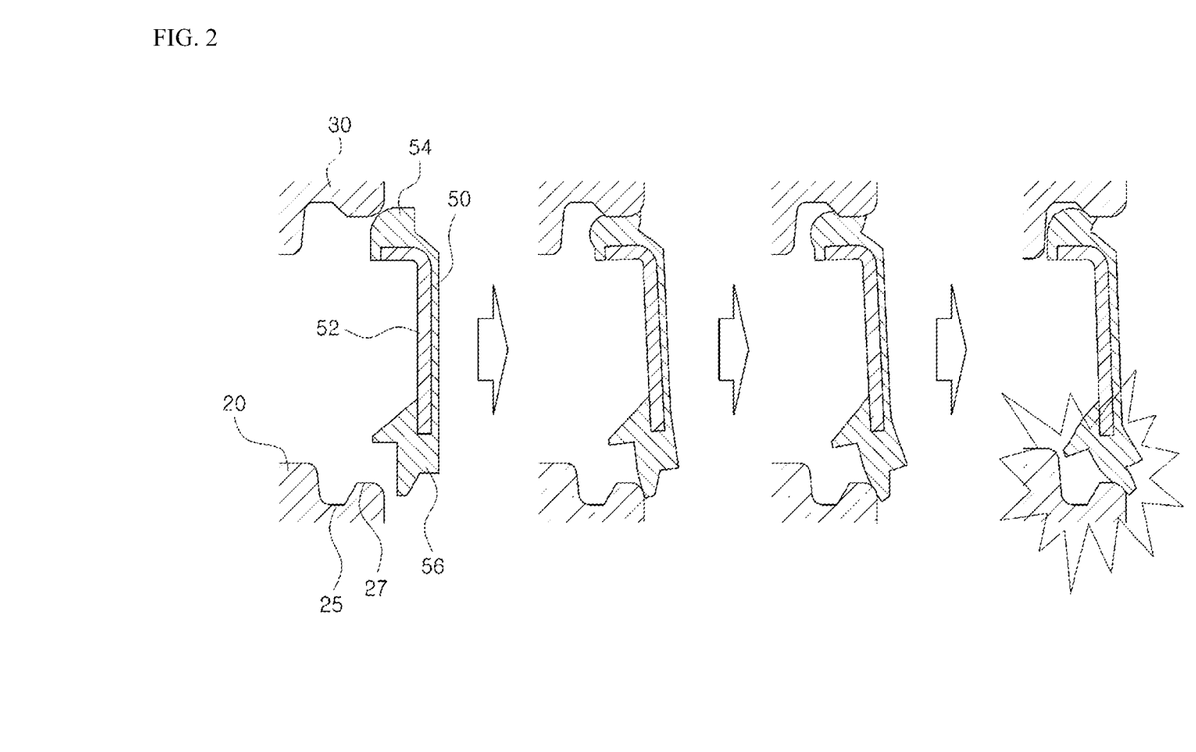
FIG. 2 exemplarily illustrates a state in which interference occurs at the time of assembly of a sealing member having a relatively long radial sealing lip that operates in the non-contact manner in the rolling bearing illustrated in FIG. 1.

However, in the case of the non-contact-type sealing member 50 having the structure described above, when the radial sealing lip 56b is formed to have a relatively long length, the radial sealing lip 56b may interfere with the stepped portion 27 of the inner ring 20 during the assembly of the sealing member 50 in the rolling bearing 10 as illustrated in FIG. 2. This makes it difficult to perform the assembly in a smooth manner.

For this reason, in the conventional non-contact-type sealing member 50, the radial length d between the stepped portion 27 formed at the end portion of the inner ring 20 and the radial end portion of the radial sealing lip 56b is typically set to less than 3 mm, which causes a limit to improve the sealing property of the non-contact-type sealing member 50.

SUMMARY

Technical Problem

The present invention was made for the purpose of solving the above problems related to a conventional rolling bearing, and an object of the present invention is to provide a rolling bearing capable of improving a sealing property of a sealing member in which a non-contact-type sealing lip extending radially is disposed to perform sealing while being not in contact with a sealing groove, by forming a length of a radial sealing lip as long as possible to make a labyrinth structure formed in the sealing member as long as possible while preventing a degradation of the assembliablity of the sealing member.

Technical Solution

Representative configurations of the present invention to achieve the above objects are described below.

According to an embodiment of the present invention, there is provided a rolling bearing which rotatably supports a rotary element with respect to a non-rotary element in a rotation device. The rolling bearing according to an embodiment of the present invention may comprise: a first member (for example, an inner ring) having a raceway for rolling elements formed on one side of the first member; a second member (for example, an outer ring) provided to be spaced apart from the first member in a radial direction and having a raceway for the rolling elements formed on one side of the second member; the rolling elements provided between the first member and the second member; and a sealing member provided in an axial end portion of the rolling bearing between the first member and the second member. According to an embodiment of the present invention, the sealing member may be formed in a structure in which an elastic sealing portion is attached to a frame, and the elastic sealing portion may comprise a first sealing portion formed on one end portion of the frame and a second sealing portion formed on the other end portion of the frame. According to an embodiment of the present invention, the first sealing portion may be inserted into and mounted to a coupling groove formed in the second member, and the second sealing portion may comprise an axial sealing lip extending in the axial direction from the frame and a radial sealing lip extending in the radial direction from the frame. According to an embodiment of the present invention, the axial sealing lip and the radial sealing lip of the second sealing portion may be positioned adjacent to the first member and may be configured to perform a sealing in a non-contact manner, and the radial sealing lip of the second sealing portion may be formed in a shape corresponding to a sealing groove formed in the first member and may be accommodated in the groove, and a groove may be formed at an axial outer side of the radial sealing lip to have a shape recessed obliquely and inwardly with respect to the axial direction.

According to an embodiment of the present invention, the groove formed in the second sealing portion may be formed to be recessed obliquely and inwardly at an angle of 50 to 70 degrees with respect to the axial direction.

According to an embodiment of the present invention, the groove formed in the second sealing portion may comprise two linear surfaces and a rounded portion formed at end portions of the two linear surfaces.

According to an embodiment of the present invention, the two linear surfaces constituting the groove of the second sealing portion may be formed in a parallel relationship with each other, or such that a width between the two linear surfaces is increased outward in the axial direction.

According to an embodiment of the present invention, an angle between the two linear surfaces constituting the groove of the second sealing portion may fall within a range of 0 to 40 degrees.

According to an embodiment of the present invention, the rounded portion constituting the groove of the second sealing portion may be formed in an arc shape in contact with the two linear surfaces.

According to an embodiment of the present invention, a radius of the rounded portion constituting the groove of the second sealing portion may fall within a range of 15% to 20% of an axial maximum thickness between an axial inner surface of the radial sealing lip and an axial outer surface of the second sealing portion.

According to an embodiment of the present invention, the second sealing portion may further comprise an extended portion formed at an axial outer side of the groove and configured to perform the sealing in conjunction with a stepped portion formed in the axial end portion of the first member.

According to an embodiment of the present invention, the extended portion may be positioned adjacent a stepped portion of the first member and may be configured to perform the sealing in the non-contact manner.

According to an embodiment of the present invention, the extended portion may be positioned in contact with the stepped portion of the first member and may be configured to perform the sealing in a contact manner.

According to an embodiment of the present invention, the rolling bearing may further comprise an outer recess formed at an axial outer surface of the second sealing portion to be recessed inward of the second sealing portion.

Further, the rolling bearing according to the present invention may further comprise other additional configurations without departing from the technical sprit of the present invention.

Advantageous Effects

In a rolling bearing according to an embodiment of the present invention, a groove is formed to be recessed inward of a radial sealing lip on an axial outer surface of the radial sealing lip accommodated in a sealing groove, wherein the radial sealing lip performs sealing in a non-contact manner in the sealing member mounted between an inner ring and an outer ring. Thus, even if the radial sealing lip is formed at a relatively long length, the sealing member can be stably mounted on the rolling bearing. This makes it possible to form a longer and more complex labyrinth structure in the sealing member through the radial sealing lip of a relatively long length, thus further improving the sealing property of the rolling bearing.

Further, the rolling bearing according to an embodiment of the present invention is configured such that the groove formed in the sealing member extends inside the sealing member in a direction obliquely inclined with respect to the axial direction. As a result, it is possible to prevent the sealing lip of the sealing member from being excessively thin, and thus the sealing property can be prevented from being deteriorated.

Furthermore, the rolling bearing according to an embodiment of the present invention makes it possible to control the shape of the groove formed in the sealing member in a certain range so as to improve the sealing property of the sealing member without lowering the manufacturability of the sealing member.

EXPLANATION OF REFERENCE NUMERALS

100: rolling bearing
200: first member (inner ring)
210: raceway (inner raceway)
220: sealing recess
230: inner surface (of sealing recess)
240: outer surface (of sealing recess)
250: bottom surface (of sealing recess)
260: stepped portion
300: second member (outer ring)
310: raceway (outer raceway)
320: coupling groove
400: rolling elements
410: cage
500: sealing member
600: frame
700: elastic sealing portion
710: first sealing portion
720: second sealing portion
730: axial sealing lip
740: radial sealing lip
750: groove
750*a*, 750*b*: linear surface (of groove)
750*c*: rounded portion (of groove)
760: extended portion
770: outer recess

DETAILED DESCRIPTION

Preferred embodiments of the present invention will be described in detail below with reference to the appended drawings to such an extent that the present invention can be readily carried out by one of ordinary skill in the art.

Detailed descriptions of parts irrelevant to the present invention will be omitted for the purpose of clearly describing the present invention. Throughout the specification, the same constituent elements will be described using the same reference numerals. In addition, the shapes and sizes of the respective constituent elements illustrated in the drawings are arbitrarily illustrated for the sake of convenience of description, and hence the present invention is not necessarily limited to the illustrated shapes and sizes. That is, it should be understood that specific shapes, structures, and characteristics described in the specification may be modified from an embodiment to various embodiments without departing from the spirit and scope of the prevent disclosure, and positions or dispositions of individual constituent elements may be modified without departing from the spirit and scope of the prevent disclosure. Therefore, detailed descriptions to be described below should be construed as non-limitative senses, and the scope of the prevent disclosure should be understood to include appended Claims and their equivalents.

Rolling Bearing According to Embodiment of the Present Invention

Referring to FIGS. 3 to 6, there is exemplarily illustrated an example of a rolling bearing 100 according to an embodiment of the present invention. As will be described later, the rolling bearing 100 according to an embodiment of the present invention has a structural feature in which a structure of a sealing member 500 mounted between two members [a first member 200 (e.g., an inner ring) and a second member 300 (e.g., an outer ring)] that rotate relative to each other is improved to enhance the sealing property of the rolling bearing.

Figure 3:
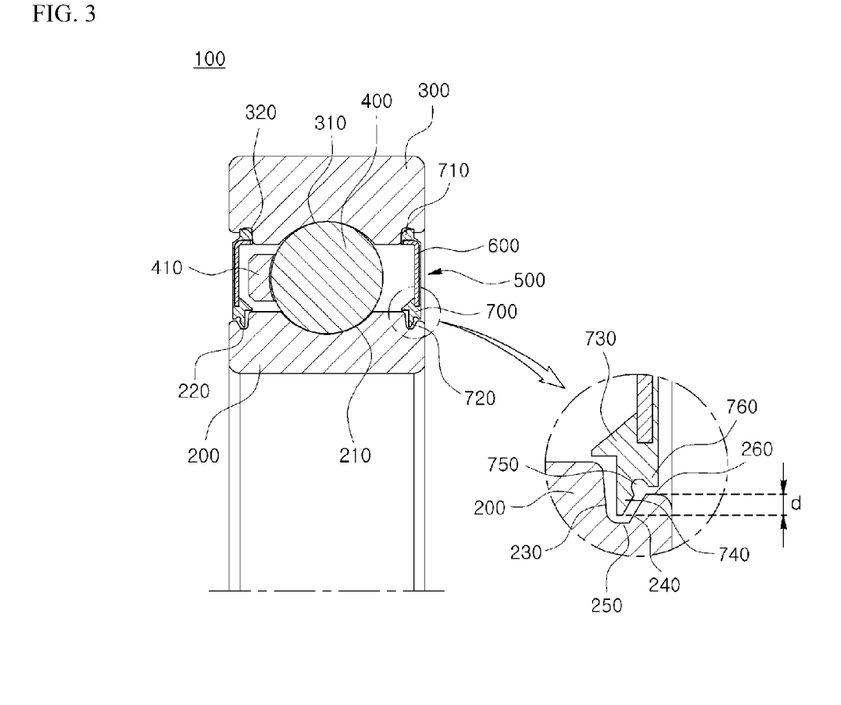
FIG. 3 exemplarily illustrates a structure of a rolling bearing according to an embodiment of the present invention.

Specifically, the rolling bearing 100 according to an embodiment of the present invention may be configured to comprise the first member 200 (the inner ring) positioned inwardly in a radial direction, the second member 300 (the outer ring) positioned outwardly in the radial direction, rolling elements 400 interposed between the first member 200 and the second member 300, a cage 410 for accommodating and supporting the rolling elements 400, the sealing member 500 mounted on an axial end portion of the rolling bearing 100, and the like.

According to an embodiment of the present invention, the inner ring 200 (the first member) may be configured to be mounted on an outer circumferential surface or the like of a rotational shaft in a press-fitting manner, and may be configured to support the rolling elements 400 from a radially inward direction through a raceway (an inner raceway 210) formed on an outer circumferential surface of the inner ring 200. Further, a sealing recess 220 may be formed in an axial end portion of the inner ring 200 to perform a sealing function in conjunction with the sealing member 500 (to be described later).

According to an embodiment of the present invention, the outer ring 300 (the second member) may be configured to be mounted in a housing or the like in a radially outward direction of the inner ring 200, and may be configured to support the rolling elements 400 from the radially outward direction through a raceway (outer raceway 310) formed on an inner circumferential surface of the outer ring 300. Further, a coupling groove 320 into which the sealing member 500 (to be described later) is inserted and mounted may be formed in an axial end portion of the outer ring 300.

According to an embodiment of the present invention, the rolling elements 400 may be arranged at a predetermined interval by the cage 410 between the inner raceway 210 formed in the inner ring 200 and the outer raceway 310 formed in the outer ring 300 such that the inner ring 200 and the outer ring 300 move relatively with respect to each other.

The rolling elements 400 may be formed in a ball or roller shape that enables such a rolling motion.

The sealing member 500 may be mounted on the axial end portion of the rolling bearing 100 between the inner ring 200 and the outer ring 300 to perform a function of preventing lubricant oil (grease) filled in the rolling bearing from leaking out or external foreign matter from entering into the rolling bearing.

Figure 4:
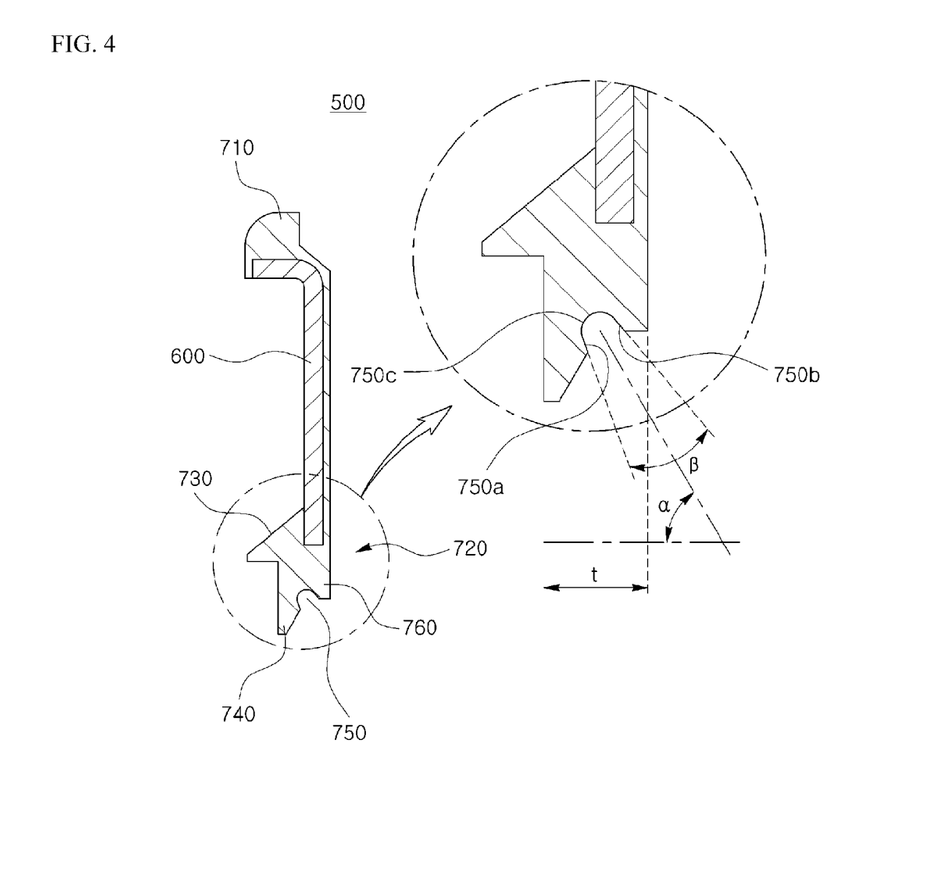
FIG. 4 exemplarily illustrates a sealing member of the rolling bearing according to an embodiment of the present invention.
Figure 5:
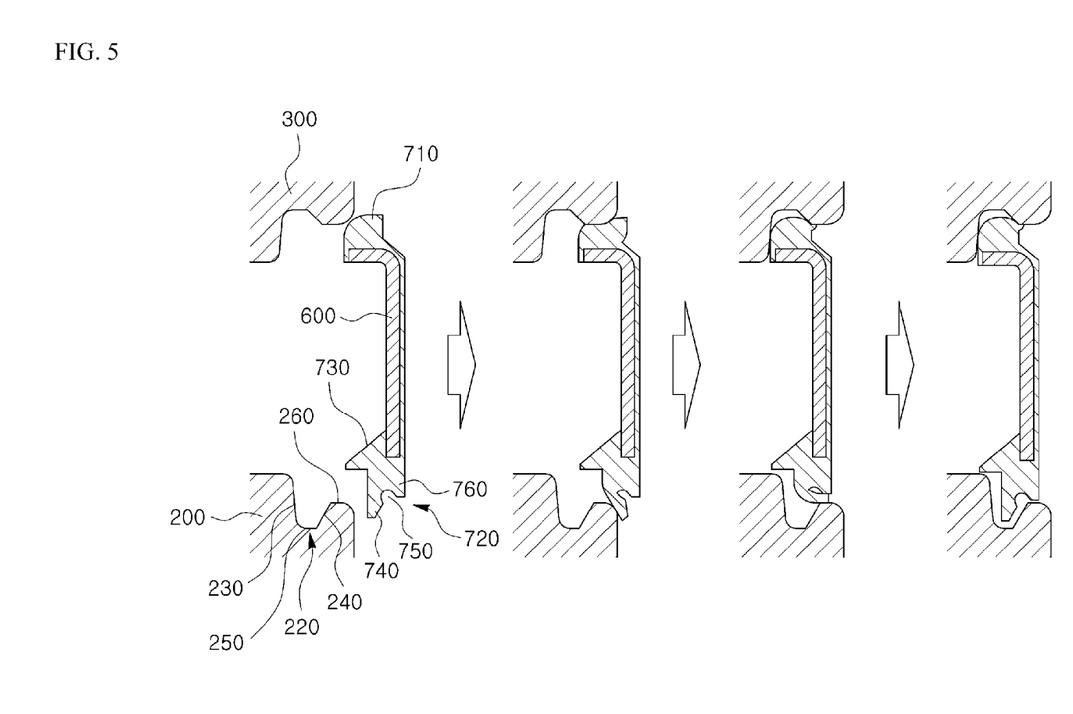
FIG. 5 exemplarily illustrates a state in which the sealing member is assembled in the rolling bearing according to an embodiment of the present invention.

According to an embodiment of the present invention, the sealing member 500 may comprise a frame 600 constituting a basic body and an elastic sealing portion 700 attached at the frame 600.

The frame 600 is a part to form a basic skeleton of the sealing member 500. According to an embodiment of the present invention, the frame 600 may be formed in a substantially ring-shaped structure with open central portion. Further, one end portion or both end portions of the frame 600 may be formed in a bent structure so that the elastic sealing portion 700 is stably attached at the frame 600.

The elastic sealing portion 700 may be formed so as to partially or entirely surround the frame 600, and may perform sealing between the inner ring 200 and the outer ring 300. According to an embodiment of the present invention, the elastic sealing portion 700 may be configured to comprise a first sealing portion 710 formed at one end portion of the frame 600 and a second sealing portion 720 formed at the other end portion of the frame 600.

According to an embodiment of the present invention, the first sealing portion 710 may be configured to seal the outer ring side of the rolling bearing 100 by being inserted into and mounted to the coupling groove 320 formed in the outer ring 300. Specifically, the first sealing portion 710 may be formed to surround around one end portion of the frame 600 and may be configured to be inserted into and fixed to the coupling groove 320 of the outer ring 300.

Further, the second sealing portion 720 may be configured to seal the inner ring side of the rolling bearing 100 in conjunction with the sealing recess 220 or the like formed in the inner ring 200. According to an embodiment of the present invention, the second sealing portion 720 may be provided with an axial sealing lip 730 extending axially from the frame 600 and a radial sealing lip 740 extending radially from the frame 600, similar to the conventional non-contact sealing lip described above. The axial sealing lip 730 and the radial sealing lip 740 may be arranged adjacent to the inner ring 200 to perform the sealing.

Specifically, the axial sealing lip 730 of the second sealing portion 720 may be formed to extend inwardly from the frame 600 toward a bearing space defined inside the rolling bearing. A narrow gap may be formed between the outer circumferential surface of the inner ring 200 and the inner circumferential surface of the axial sealing lip 730 to prevent inflow of external foreign matter or leakage of internal lubricant oil.

According to an embodiment of the present invention, the radial sealing lip 740 of the second sealing portion 720 may be formed so as to extend substantially radially from the frame 600, and may be arranged adjacent to the sealing recess 220 formed in the inner ring 200 to form a narrow gap between the radial sealing lip 740 and the outer circumferential surface of the sealing recess 220 and perform the sealing. To do this, the radial sealing lip 740 of the second sealing portion 720 may be formed in a shape corresponding to the sealing recess 220 formed on the inner ring 200.

Specifically, the sealing recess 220 formed in the inner ring 200 may be formed in a substantially triangular structure which has an inner surface 230 extending in a substantially radially inward direction, an outer surface 240 extending obliquely toward an outer end portion of the rolling bearing 100, and a bottom surface 250 connecting between the inner surface 230 and the outer surface 240. The radial sealing lip 740 of the second sealing portion 720 may be formed in a shape corresponding to the sealing recess 220 of the inner ring 200 to perform a non-contact sealing while being accommodated adjacent to the sealing recess 220 of the inner ring 200.

According to an embodiment of the present invention, a groove 750 may be formed at an axial outer side of the radial sealing lip 740 to have a shape recessed inwardly of the second sealing portion 720 in a direction obliquely inclined with respect to the axial direction. By forming the inwardly-recessed groove 750 at the axial outer side of the second sealing portion 720, it is possible to prevent the assembly of the sealing member 500 from being disturbed due to interference between the sealing portion (the second sealing portion 720) of the sealing member 500 and the inner ring (the stepped portion 260 of the inner ring 200) in the course of mounting the sealing member 500 to the rolling bearing 100 as will be described later. Thus, by forming the radial sealing lip 740 that performs the main sealing function in the non-contact-type sealing member to have a relatively long length and forming a labyrinth structure of a relatively long length between the radial sealing lip 740 and the sealing recess 220 of the inner ring 200, it is possible to further improve the sealing property of the sealing member.

According to an embodiment of the present invention, the groove 750 formed at the axial outer side of the second sealing portion 720 may preferably be formed so as to extend inward of the second sealing portion 720 at an angle α obliquely inclined with respect to the axial direction, preferably at an angle α of approximately 50 to 70 degrees obliquely inclined with respect to the axial direction. By depressing a portion of the second sealing portion 720 in a direction inclined at a certain angle with respect to the axial direction, it is possible to prevent a thickness of the radial sealing lip 740 from being excessively reduced due to the formation of the groove 750, thus suppressing degradation of the sealing property. Further, it is possible to effectively solve the problem of lowering the assemblability due to the interference of the radial sealing lip 740.

According to an embodiment of the present invention, the groove 750 formed in the second sealing portion 720 may be configured to comprise two linear surfaces 750a and 750b opposite each other, and a rounded portion 750c formed at ends of the two linear surfaces 750a and 750b.

According to an embodiment of the present invention, the two linear surfaces 750a and 750b constituting the groove 750 may be formed in a parallel relationship with each other, or in a structure inclined with respect to each other such that a width between the two linear surfaces 750a and 750b increases outward in the axial direction. An angle β between the two linear surfaces 750a and 750b may preferably be in a range of 0 to 40 degrees. If the two linear surfaces 750a and 750b are formed such that the width therebetween is reduced as it goes outward in the axial direction (at an angle of less than 0 degrees), interference may more easily occur at the time of assembly of the sealing member. This makes it difficult to sufficiently prevent degradation of the assembliablity due to the radial sealing lip 740, which makes it difficult to make the radial sealing lip 740 longer. If the two linear surfaces 750a and 750b are formed at an angle of more than 40 degrees, a sufficient area may not be secured in an axial outer end surface of the radial sealing lip 740 (in the embodiment illustrated in the drawings, an end surface corresponding to the outer surface 240 of the sealing recess 220). This makes it difficult to secure a labyrinth structure of a sufficient length between the radial sealing lip 740 and the sealing recess 220, thus degrading the sealing property.

According to an embodiment of the present invention, the groove 750 formed at an axial outer side of the radial sealing lip 740 may be configured such that the rounded portion 750*c* formed at the inner end portions of the two linear surfaces 750*a* and 750*b* is formed in an arc shape in contact with the two linear surfaces 750*a* and 750*b*. According to an embodiment of the present invention, the arc shape of the rounded portion 750*c* may be formed to have a radius that corresponds to 15 to 20% of a thickness t between the axial inner surface of the radial sealing lip 740 and the axial outer surface of the second sealing portion 720. When the radius of the rounded portion 750*c* is less than 15% of the thickness t, the productivity of the sealing lip may be too low. When the radius of the rounded portion 750*c* is more than 20% of the thickness t, the thickness of the sealing lip may be too thin, resulting in deterioration in structural stability and functionality.

According to an embodiment of the present invention, the radial sealing lip 740 of the second sealing portion 720 may further comprise an extended portion 760 at an outer end portion. The extended portion 760 may be arranged adjacent to the stepped portion 260 formed at the axial end portion of the inner ring 200 to form a labyrinth structure in conjunction with the stepped portion 260.

Figure 6:
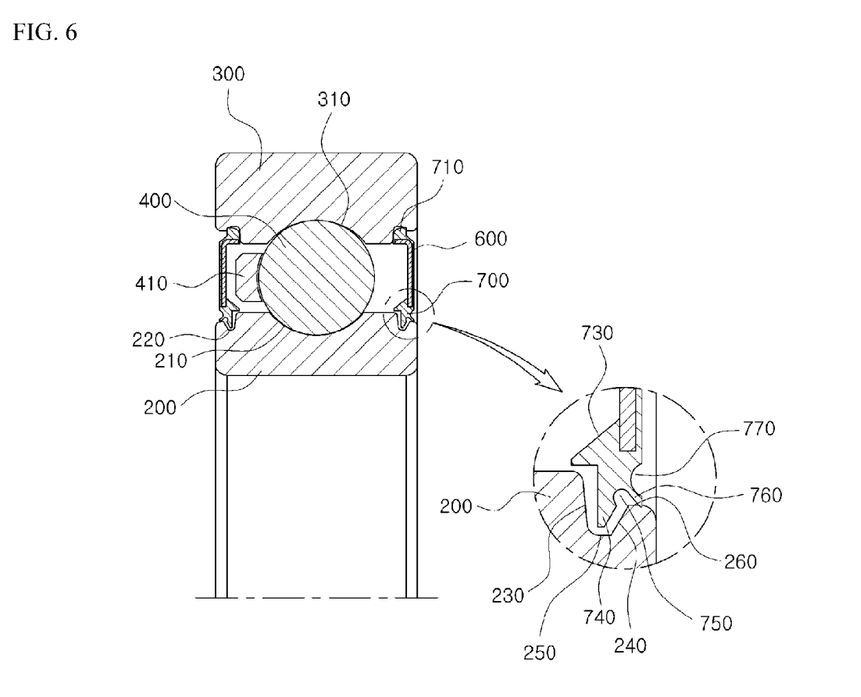
FIG. 6 exemplarily illustrates a structure of a rolling bearing according to another embodiment of the present invention.

According to an embodiment of the present invention, as illustrated in FIGS. 3 and 4, the extended portion 760 may be formed to be positioned adjacent to the stepped portion 260 while being in non-contact with the stepped portion 260 formed at the axial end portion of the inner ring 200 to perform sealing in a non-contact manner. In another embodiment, as illustrated in FIG. 6, the extended portion 760 may be formed to be positioned in contact with the stepped portion 260 at a certain amount of interference to perform sealing in a contact manner. According to an embodiment of the present invention, in the case in which the extended portion 760 is positioned in contact with the stepped portion 260 of the inner ring 200 at a certain amount of interference as illustrated in FIG. 6, an outer recess 770 may be further formed at the axial outer surface of the second sealing portion 720 to be recessed inward of the second sealing portion 720 so that the thickness of the extended portion 760 is further decreased and a drag torque does not greatly increase by the contact between the extended portion 760 and the stepped portion 260 of the inner ring 200.

As mentioned above, the sealing member 500 according to an embodiment of the present invention has the groove 750 formed to be recessed inwardly at the axial outer surface of the radial sealing lip 740. Thus, when the sealing member 500 is mounted on the rolling bearing 100, the radial sealing lip 740 of the sealing member 500 may be inserted into the sealing recess 220 while being deformed more smoothly (see FIG. 5). Accordingly, even if the radial sealing lip 740 performing the main sealing function is formed to have a relatively long length (for example, a radial length d from the stepped portion of the inner ring to the radial end portion of the radial sealing lip is formed to a length greater than 0.3 mm, preferably in a range of 0.4 to 0.6 mm), the sealing member 500 can be smoothly assembled without interference. Thus, the radial sealing lip 740 enables a labyrinth structure of a relatively long length to be formed inside the sealing member 500, which makes it possible to further improve the sealing property of the sealing member.

While the present invention has been described above by way of particular features such as specific constituent elements and the like, and exemplary embodiments, these embodiments are provided to further facilitate overall understanding of the present invention, and the present invention is not limited thereto. Various modifications and variations may be made from the above descriptions by those skilled in the art. As an example, although the rolling bearing according to an embodiment of the present invention has been described in the above-described embodiments with the example in which the inner ring is mounted on the rotational shaft and the outer ring is mounted on the non-rotary element such as the housing, the rolling bearing may be configured to have another structure in which the inner ring is mounted on the non-rotary element and the outer ring is mounted on the rotary element.

Therefore, the spirit of the present invention should not be limited to the above-described embodiments, and not only the append claims but also all those modified equally or equivalently to the claims are intended to fall within the scope of the spirit of the present invention.

What is claimed is:

1. A rolling bearing, comprising:
   a first member having a raceway for rolling elements formed on one side of the first member;
   a second member provided to be spaced apart from the first member in a radial direction and having a raceway for the rolling elements formed on one side of the second member;
   the rolling elements provided between the first member and the second member; and
   a sealing member provided in an axial end portion of the rolling bearing between the first member and the second member,
   wherein the sealing member is formed in a structure in which an elastic sealing portion is attached to a frame,
   the elastic sealing portion comprises a first sealing portion formed on one end portion of the frame and a second sealing portion formed on the other end portion of the frame,
   the first sealing portion is inserted into and mounted to a coupling groove formed in the second member,
   the second sealing portion comprises an axial sealing lip extending in an axial direction from the frame and a radial sealing lip extending in the radial direction from the frame,
   the axial sealing lip and the radial sealing lip of the second sealing portion are positioned adjacent to the first member and are configured to perform a sealing in a non-contact manner,
   the radial sealing lip of the second sealing portion is formed in a shape corresponding to a sealing groove formed in the first member and is accommodated in the groove, and
   a groove is formed at an axial outer side of the radial sealing lip to have a shape recessed obliquely and inwardly with respect to the axial direction,
   wherein the groove formed in the second sealing portion comprises two linear surfaces, and a rounded portion formed at end portions of the two linear surfaces, and
   wherein a radius of the rounded portion constituting the groove of the second sealing portion falls within a range of 15% to 20% of an axial maximum thickness t between an axial inner surface of the radial sealing lip and an axial outer surface of the second sealing portion.

2. The rolling bearing of claim 1, wherein the groove formed in the second sealing portion is formed to be recessed obliquely and inwardly at an angle of 50 to 70 degrees with respect to the axial direction.

3. The rolling bearing of claim 1, wherein the two linear surfaces constituting the groove of the second sealing portion are formed in a parallel relationship with each other, or such that a width between the two linear surfaces is increased outward in the axial direction.

4. The rolling bearing of claim 3, wherein an angle between the two linear surfaces constituting the groove of the second sealing portion falls within a range of 0 to 40 degrees.

5. The rolling bearing of claim 4, wherein the rounded portion constituting the groove of the second sealing portion is formed in an arc shape in contact with the two linear surfaces.

6. The rolling bearing of claim 1, wherein the second sealing portion further comprises an extended portion formed at an axial outer side of the groove and configured to perform the sealing in conjunction with a stepped portion formed in the axial end portion of the first member.

7. The rolling bearing of claim 6, wherein the extended portion is positioned adjacent a stepped portion of the first member and is configured to perform the sealing in the non-contact manner.

8. The rolling bearing of claim 6, wherein the extended portion is positioned in contact with the stepped portion of the first member and is configured to perform the sealing in a contact manner.

9. The rolling bearing of claim 1, further comprising: an outer recess formed at an axial outer surface of the second sealing portion to be recessed inward of the second sealing portion.

* * * * *